July 14, 1942.  F. BERRY  2,290,027
POWER TRANSMISSION CONTROL APPARATUS
Filed April 23, 1940   2 Sheets-Sheet 2
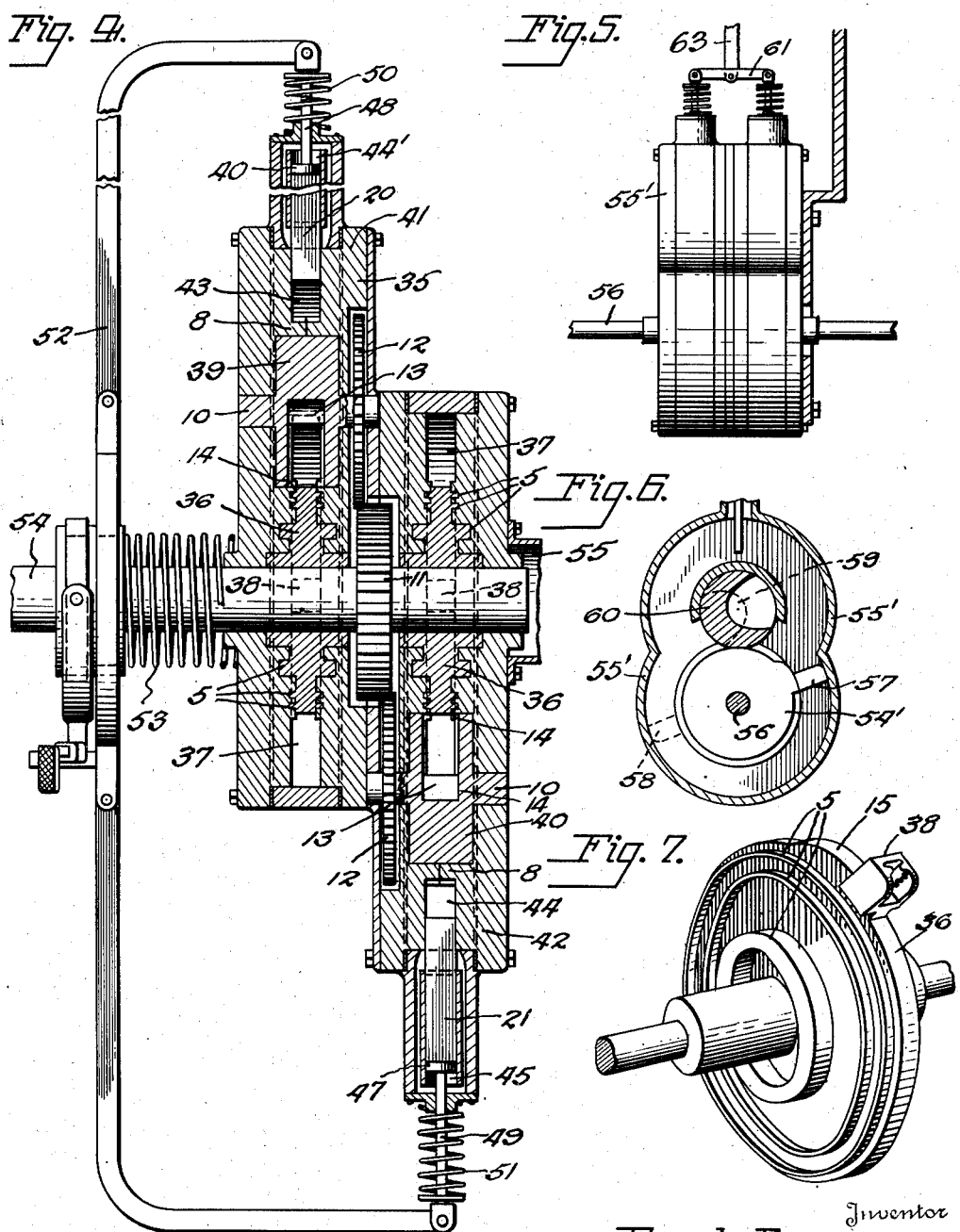
Inventor
Frank Berry

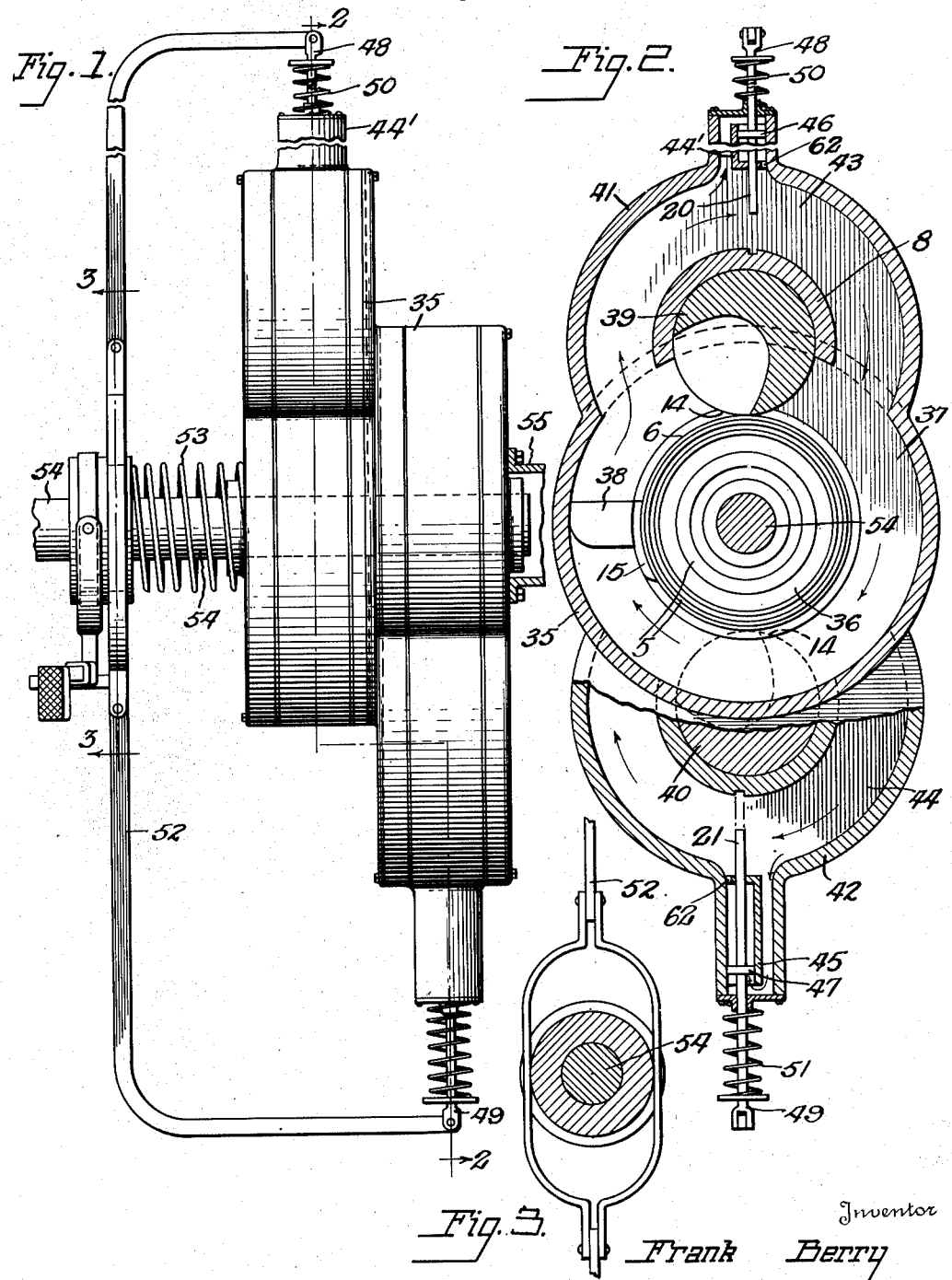

Patented July 14, 1942

2,290,027

UNITED STATES PATENT OFFICE 2,290,027

POWER TRANSMISSION CONTROL APPARATUS

Frank Berry, Corinth, Miss., assignor to W. L. McPeters, Corinth, Miss., as trustee Application April 23, 1940, Serial No. 331,226

12 Claims. (Cl. 192—58)

This invention concerns improvements in power transmission control such as fluid clutches and brakes, of that type in which a rotary piston on a shaft travels about an annular cylinder in a surrounding casing, the cylinder being filled with a liquid, and the movement of the liquid being normally blocked by a rotary abutment positioned across the cylinder. Such apparatus is known in the art, but heretofore has lacked means to minimize pressure fluctuations.

It is, of course, essential for the disengagement of such a clutch or brake that means be provided to release the pressure upon the abutment so as to permit free displacement of the liquid by the piston, and means must also be provided for gradually and progressively increasing the pressure of the liquid column for taking up the load without grabbing.

In apparatus of this type, the differential rotation of the piston and casing makes it necessary that the piston shall periodically pass through the abutment, the two being synchronously driven, and the abutment having a transition chamber coming into phase with the piston to effect the passage of the latter from the high to the low pressure side of the cylinder.

When the abutment chamber is in a position communicating commonly with the high and low pressure sides of the cylinder the pressure of the liquid columns is relieved, causing clutch or brake release. This pressure is restored upon the movement of the abutment to a position closing communication between the high and low pressure sides of the cylinder. This might happen a number of times in the interval required for complete engagement, but even when the apparatus is fully engaged, the slight inevitable speed differential between the parts due to slow leakage past the joints of the liquid-confining members will occasionally bring the abutment into pressure-releasing position and cause undesired pressure release.

The primary object of the present invention is to provide means to minimize the undesirable effects of pressure fluctuations to obtain continuous smooth operation of the clutch or brake structures.

Another object of the invention is to provide means to automatically compensate for pressure variations after the initial setting of the mechanism by manual means.

An additional purpose of this invention is to construct a clutch or brake of simple parts and arrangements to facilitate large scale construction and assembly. These and other purposes will be apparent in the following description of preferred embodiments of this invention, taken with the accompanying drawings and appended claims.

In the drawings:

Figure 1 shows in side elevation an embodiment of this invention applied as a clutch;

Figure 2 shows a vertical cross section taken along the line 2—2 of Figure 1.

Figure 3 is a section along the line 3—3 of Figure 1 showing a mounting for a yoke, part of the equalizing toggle for the two clutch cylinders;

Figure 4 is a vertical section through the clutch taken on the line 4—4 of Figure 2 showing the two cylinders, pistons and abutments and the gearing for synchronizing the movement of the pistons and abutments;

Figure 5 shows in elevation a modification of this invention as a brake arrangement;

Figure 6 is a vertical cross section of the brake arrangement shown in Figure 5;

Figure 7 is a perspective view of one of the rotors with piston attached.

Reference is made to the drawings of an illustrative embodiment of this invention. However, the invention may be practiced otherwise than is shown in the drawings.

The vertical casing 35 comprising opposed sections bolted together encloses chambers 37. Extending through the center of the casing 35 is a shaft 54 to which are secured a pair of rotors 36. These rotors convert to annular form the chambers 37. These annular chambers become working chambers for the pistons.

Illustrative details of construction of the central rotor and the accompanying parts are shown in Figures 2 and 4. As both chambers 37 and both rotors 36 are identical, only one will be described. The rotor 36 is essentially of disc-like form. Its side walls contain circular fins or baffles 5 preferably arranged concentrically as shown adapted to engage corresponding recesses in the side walls of the casing. These vanes engaging in their grooves act to prevent the escape of liquid which fills the chamber 37. Affixed to the edge 6 of the rotor is a piston 38. This piston 38 may be secured to rotor 36 in any suitable manner. The rear face of the piston preferably is plane, but the forward face may be arcuate. The top of the piston may be curved to conform to the outer wall of annular chamber 37.

Adjacent each annular chamber and at diametrically opposed positions, the casing contains a dome 8 to house the cylindrical abutments 39 and 40. These abutment cylinders are mounted on shafts 10 on opposite sides of and parallel to rotor shaft 54. These shafts 54 and 10 are connected by gear wheels 11 and 12 of 1:1 ratio so that the shafts revolve at the same rate. Thus the abutment cylinders 39 and 40 are rotated once in synchronism with each rotation of rotor 36 and attached piston 38.

Provision is made to assure early sealing of the annular chambers or cylinders after each passage of piston 38. Abutment cylinders 39 and 40 each contains an arcuate passageway 13 that arches over its rotor 36 during a certain phase of revolution so that piston 38 may move therethrough in passing the abutment. The side walls of chambers 37 contain arcuate depressions 14 into which abutments 39 and 40 nest, as illustrated in Figure 2. The side walls containing depression 14 extend under the actual piston chamber 37 so that the only open space where line contact between the abutment and rotor exists and where the abutment does not nest in depression 14 is the relatively narrow space of the piston stem. Thus is provided an extensive seal against escape of liquid from power chamber 37. Further, to assure adequate sealing, rotors 36 bear a ridge 15 at the rear face of piston 38, as shown in Figure 2. These ridges 15 are of such contour that the descending, lagging edge of recess 13 on closing contacts this ridge 15 as the rotor 36 moves, and follows down the sloping rearward edge of ridge 15 to seal chamber 37 as soon as piston 38 has passed and before abutment passageway 13 has entirely rotated away from rotor 36. Thus is provided quick and progressively increased sealing as the piston passes the abutment. It is evident that with ridge 15 on rotor 36 and with side vanes 5 on rotor 36, adequate sealing against leakage of liquid is provided. Further, the extensive outer peripheral surface of piston 38 likewise assures sealing at the outer periphery of chamber 37.

The above description concerning the construction of the casing, rotor, and abutment is in general terms, and a more specific description of these parts is contained in my co-pending application Serial No. 372,923, filed January 2, 1941, which application is a continuation-in-part of the present application.

As shown in the drawings, the two rotors 36 and their attached pistons 38 occupy identical positions within their respective chamber 37 and rotate in the same phase, that is, the pistons are abreast of one another and lie in a common radial plane extending from their axis of rotation. The abutments 39 and 40 occupy diametrically opposed positions, each across its respective cylinder, and act to receive the coupling thrust as transmitted from the pistons through the liquid columns which fill the cylinders. By having the pistons rotate in the same phase, and the respective abutments diametrically opposed, only one cylinder at a time will be in pressure release position, the other abutment being closed. As it is essential for the disengagement of this type of clutch that means be provided to release the pressure upon the abutments to permit free displacement of the liquid by the pistons, passageways 43 and 44 within extended portions 41 and 42 of the casing, provide by-passes for the liquid around the abutments from the high pressure side of each cylinder to the low pressure side.

Throttling means to regulate the rate of flow of fluid through the by-passes is provided in the form of baffles or gates 20 and 21, freely reciprocable in and out of the casing to vary the cross-sectional area of the by-passes.

In such a construction as described, the conditions of operation are as follows; it being assumed that both throttling means are set to define the same cross-sectional area in the two by-passes. The load of the driven member, which we will say is the casing, or such portion of the load as is determined by the degree of throttling of the by-passes, is borne equally by both pistons, while both abutments are in closed position. Now, when one abutment reaches the piston-passing phase with its transition chamber open to both sides of the cylinder, the piston of that cylinder will be relieved of its share of the load, which share will be added to the load borne by the other piston. This will increase the pressure of the last named piston against the liquid column in its cylinder, increasing momentarily the velocity of displacement of liquid through the throttled by-pass of said cylinder. This would ordinarily produce slippage of the clutch.

To prevent clutch slippage due to the increased velocity of displacement, means are provided for further throttling said by-pass to reduce the accelerated velocity flow through said by-pass to such an extent that the flow will be the same as it was before the piston of said cylinder was called upon to bear the load of both pistons. Such means provides automatic compensation for variations in pressure between the cylinders after the initial throttling of the by-pass by manual means, and also provides that when the cross-section of one by-pass is thus reduced, the cross-section of the opposite by-pass is correspondingly increased, and after said abutment has moved to closed position, the by-pass cross-sections are equalized and an equal proportion of the load is again carried by both pistons.

Extending outwardly from the by-pass housings 41 and 42 and in communication with the by-passes, are chambers in which are positioned baffle-control cylinders 44' and 45 to receive slidably pistons 46 and 47 attached to the baffles 20 and 21. The outer end of each baffle-control cylinder is open to the chamber in which it is positioned and therefore the said cylinder is in communication with the high pressure side of the by-pass and the pistons 46 and 47 are affected by pressure variations within the by-passes. The end of each baffle-control cylinder adjacent the by-pass is closed except for an orifice 62 communicating with the low pressure side of the by-pass, whereby liquid may flow in and out of the control cylinder as its piston moves, to prevent pressure or vacuum locks within the cylinder.

Rods 48 and 49, secured to pistons 46 and 47, extend through the casing and are connected for synchronous movement by means of a toggle 52. Toggle 52 has a central section in the form of an elongated yoke, the sides of which yoke floatingly fit within an annular groove in a collar mounted on the drive shaft 54, which collar may be moved axially of the shaft by means of a pedal, against the tension of the spring 53. Links pivotally connect the ends of the yoke with the rods 48 and 49. It can readily be seen that as the collar is moved towards the casing, rods 48 and 49 may move outward under the influence of springs 50 and 51, which surround the rods, and the baffles 20 and 21 are withdrawn from the by-passes 43 and 44. Movement of the collar away from the casing depresses the rods and baffles and decreases the cross-sectional area of the by-passes.

As the actuating pedal is moved, and the baffles restrict the cross-sectional area of the by-passes, pressure is built up in the liquid columns between the pistons 38 and the baffles. This pressure is transmitted to the outer faces of the pistons 46 and 47. Assuming that both abutments are closed, and springs 50 and 51 are of equal strength, the pressure upon pistons 46 and 47 will cause the toggle 52 to "float" until the pressure is equalized in both chambers 37 and this equalized pressure will compress the springs 50 and 51 an equal amount. Now, when one of the abutments reaches the piston-passing phase, pressure will be released in that cylinder and by-pass, relieving the pressure upon that baffle-control piston and permitting its baffle spring to expand. This will allow the other baffle-control piston, in the cylinder in which pressure is still maintained, to move further in, compressing its spring, and decreasing the cross-sectional area of the by-pass, thus compensating for the increased load borne by the cylinder. As soon as the first mentioned abutment again closes, pressure will be built up in its cylinder and by-pass and the equalizing toggle will again permit the baffles to adjust themselves until an equal share of the load is borne by both piston 38.

It will be observed that the flow of liquid through the cylinders 37 and their respective by-pass when throttled by the baffles tends to propel the outer casing. To this outer casing is affixed a hollow shaft 55. Thus rotation of the fluid and rotation of the casing thereby effects rotation of the hollow shaft. In this way power from the drive shaft is communicated through the clutch system to the hollow shaft with substantially no fluctuation of pressure variations despite the alternations due to the rotating abutments.

Certain advantages of this invention similarly appear when this apparatus is applied as a brake. Thus, for example as illustrated in Figures 5 and 6, a casing 55' may be mounted about a driven shaft, for example, a car axle 56. Upon the shaft and corresponding rotors 54' arranged similarly to the clutch hereinbefore described may be affixed a pair of pistons 57 and 58. These are mounted in opposed relationship to each other. A corresponding pair of abutments 59 and 60 mounted in axial alignment, with their transition chambers in opposed relationship to each other may be mounted in separate chambers and on a common shaft so that first one abutment and then the other is brought into operation. At each passage of piston through abutment, there will be a decrease in pressure of liquid filling the piston chambers. To offset this fluctuation an arrangement of a by-pass for each abutment with internal baffle-control cylinder and piston to which is attached a baffle may be provided in manner similar to those already described with respect to the clutch in Figures 1 through 4. Each piston rod is connected to the other by an intermediate fluctuation equalizer 61, centrally pivoted to a lever 63 which may be operated by a pedal (not shown) to initially set the baffles, as illustrated in Figure 5. Thus as pressure is decreased in the one by-pass, it is increased correspondingly in the other. The result as a whole is a smooth braking effect on the central shaft 56. The entire brake is applied by pressure on the equalizing rod 61 in the usual manner of applying a brake. As the brake is applied therefore, braking pressure is applied hydraulically to axle 56 but without substantial fluctuations due to pressure variations from the opening and closing of the piston abutments.

While in accordance with the patent statutes I have described a preferred embodiment of this invention, it will now be apparent to those skilled in the art that modifications and alterations may be made in accordance with the appended claims.

What I claim is:

1. Apparatus to transmit power comprising a pair of annular chambers adapted to be filled with liquid, a pair of central rotors therein and a piston attached to each rotor, a pair of rotary abutments, one abutment across each chamber and mounted at diametrically opposed positions, a by-pass conduit around each abutment, a valve in each conduit, and a shaft affixed to the rotor for driving and a second shaft affixed to the chamber walls to be driven.

2. Apparatus to transmit power comprising a pair of annular chambers adapted to be filled with liquid, a pair of central rotors therein and a piston attached to each rotor, a pair of rotary abutments one abutment across each chamber and mounted at diametrically opposed positions, a by-pass conduit around each abutment, and a shaft affixed to the rotor for driving and a second shaft affixed to the chamber walls to be driven, and a valve in each by-pass responsive to decrease in pressure therein to close the opposite by-pass to minimize pressure fluctuations.

3. Apparatus to transmit power comprising a pair of annular chambers adapted to be filled with liquid, a pair of central rotors therein and a piston attached to each rotor, a pair of rotary abutments one abutment across each chamber and mounted at diametrically opposed positions, a by-pass conduit around each abutment, and a shaft affixed to the rotor for driving and a second shaft affixed to the chamber walls to be driven, and a valve in each by-pass, a valve stem bearing a piston, a cylinder housing, the cylinder being open at the top and adapted for value response of the piston to pressure fluctuation in the by-pass.

4. Apparatus to transmit power comprising a pair of annular chambers adapted to be filled with liquid, a pair of central rotors therein and a piston attached to each rotor, a pair of rotary abutments one abutment across each chamber and mounted at diametrically opposed positions, a by-pass conduit around each abutment, and a shaft affixed to the rotor for driving and a second shaft affixed to the chamber walls to be driven and a valve in each by-pass responsive to decrease in pressure therein to close the opposite by-pass to minimize pressure fluctuations, and a member connecting the valves to effect opposed synchronized action thereof in resistance to pressure fluctuations.

5. Apparatus to transmit power comprising a pair of annular chambers adapted to be filled with liquid, a pair of central rotors therein and a piston attached to each rotor, a pair of rotary abutments one abutment across each chamber and mounted at diametrically opposed positions, a by-pass conduit around each abutment, and a shaft affixed to the rotor for driving and a second shaft affixed to the chamber walls to be driven and a valve in each by-pass responsive to decrease in pressure therein to close the opposite by-pass to minimize pressure fluctuations, and a member connecting the valves to effect opposed synchronized action thereof in resistance to pressure fluctuations, and means to position the valves as a whole at various intermediate position to determine the power transmission of the apparatus.

6. Apparatus to regulate power transmission in a rotary motor comprising a central rotor and shaft, opposed pistons attached thereto, rotary abutments mounted in axial alignment and having transition chambers, the chambers in respective abutments being in opposed relationship, to synchronize with the respective pistons, and a by-pass around each abutment, each by-pass containing a valve, each rotor and by-pass being in a separate chamber.

7. Apparatus to regulate power transmission in a rotary motor comprising a central rotor and shaft, opposed pistons attached thereto, rotary abutments mounted in axial alignment and having transition chambers, the chambers in respective abutments being in opposed relationship, to synchronize with the respective pistons, and a by-pass around each abutment, the pistons with respective abutments and by-passes being in separate chambers, each by-pass containing a floating valve, and means to equalize the valves against pressure fluctuations.

8. In power transmission control apparatus having a pair of annular cylinders adapted to be filled with a fluid and a pair of rotors therein, a piston carried by each rotor, a rotary abutment across each cylinder, the pistons and abutments being so arranged as to maintain pressure in one cylinder while the piston in the other cylinder is passing through its abutment, a fluid by-pass around each abutment and a baffle in each by-pass to control the flow of fluid therethrough.

9. Power transmission control apparatus as claimed in claim 8, and manual means to control the initial position of the baffles within the by-passes.

10. Power transmission control apparatus as claimed in claim 8, and means to automatically adjust the positions of the baffles, in inverse ratio to each other within the by-passes to compensate for pressure variations between the cylinders.

11. Power transmission control apparatus as claimed in claim 8, means to normally urge the baffles outward, and means to link the baffles together whereby a decrease in pressure in one cylinder will cause the baffles to move to create an increase in pressure in the other cylinder.

12. In power transmission control apparatus having a pair of annular cylinders adapted to be filled with a fluid and a pair of rotors therein, a piston carried by each rotor, a rotary abutment across each cylinder, the pistons and abutments being so arranged as to maintain pressure in one cylinder while the piston in the opposite cylinder is passing through its abutment, a fluid by-pass around each abutment, a baffle in each by-pass, manual means to control the position of the baffles within the by-passes and means to automatically adjust the baffles in inverse ratio to each other to compensate for pressure variations between the cylinders.

FRANK BERRY.